United States Patent Office 3,216,834
Patented Nov. 9, 1965

3,216,834
PALLADIUM DECORATING COMPOSITIONS
Howard M. Fitch, Summit, N.J., assignor to Engelhard Industries, Inc., Newark, N.J., a corporation of Delaware
No Drawing. Filed Oct. 5, 1960, Ser. No. 60,575
3 Claims. (Cl. 106—1)

The invention relates to decorating compositions and more particularly to new and improved palladium decorating compositions adapted for use in decorating articles with adherent palladium and palladium-containing metallic films.

Decorating compositions containing soluble gold and palladium resinates are known in the prior art. While these compositions have proven satisfactory in certain respects, they have been disadvantageous for the reasons that the palladium resinates are incompatible with certain of the common and desirable decorating vehicles. Secondly, the prior art compositions containing the palladium resinates are disadvantageous for decorating materials of limited thermal stability such as plastics and plastic laminates. Thirdly, the prior art palladium resinates, being made from terpenes or sulfurized terpenes, vary in composition and properties depending on the extent and conditions of sulfurization and the source of the terpene from which they are made. This is a disadvantage in that decorating compositions prepared from such palladium resinates tend to be variable and not easily reproduced.

Compositions containing platinum for use in decorating glass and ceramics are also known in the prior art. Such compositions contain a platinum resinate prepared by causing a platinum salt to react with a sulfurized terpene such as sulfurized Venetian turpentine. The platinum-containing decorating compositions are disadvantageous for the reasons: (1) their high cost due to the highly expensive platinum; (2) properties infereior to those of the palladium resinate decorating compositions for certain applications, for instance, giving fired films having electrical and reflective properties inferior for some purposes to those of fired films obtained from palladium decorating compositions, and (3) the tendency for platinum to be not readily available.

In accordance with the present invention, it has been found that considerably improved palladium decorating compositions are provided by compositions comprising a bisthioether palladous salt coordination compound, and an organic vehicle for the coordination compound. These novel palladium decorating compositions constitute a considerable improvement for the reasons: (1) the prefered bisthioether palladous salt coordination compounds are compatible with virtually all of the common decorating vehicles and are compatible with virtually all of the most desirable decorating vehicles with which the palladium resinates are incompatible, whereby the most advantageous decorating compositions can be readily prepared; (2) variability in the decorating compositions containing the bisthioether palladous salt coordination compounds is eliminated because these coordination compounds are definite chemical compounds of known structure and easily and hence consistently reproduced, while the decorating compositions made from palladium resinates tend to vary in composition from one composition to the next because the palladium resinates vary in composition and properties from one preparation to the next as previously discussed; and (3) the prefered decorating compositions give lustrous metallic films when fired at temperatures considerably lower than those required for firing the palladium resinates, typically 30° to 60° C. lower than the temperatures required for firing the palladium resinates. The last mentioned advantage is a major one in decorating compositions for decorating substrates of limited thermal stability such as plastics and plastic laminates.

While the decorative effect due to the lustrous or bright palladium-containing metal deposit resulting from the firing is an outstanding property of decorating with the palladium decorating compositions of the invention, the metal deposits inherently possess other useful properties such as a high degree of reflectivity to light making them eminently adapted for use as reflectors and mirrors; reflectively to infrared radiation, making them useful as reflectors for lamps, ovens and the like and to protect materials exposed to high temperatures; electrical conductivity, making them useful in forming printed circuits, resistors and capacitors and as bases for soldering connections to non-conductive materials, for electroplating and for plating by dipping in molten metals and alloys; and good mechanical strength, making them useful in forming vacuum type glass to metal seals and the like. Very thin films of metal produced from the palladium decorating compositions show selective transmission of light, making them useful as optical filters.

The preferred bisthioether palladous salt coordination compounds for use in the palladium decorating compositions of the invention are dichlorobisdialkylsulfidepalladium (II) compounds. The dichlorobisdiprimaryalkylsulfidepalladium (II) compound in which the diprimaryalkylsulfide contains at least five carbon atoms are particularly preferred as ingredients in the palladium decorating compositions because of their high solubility in organic decorating vehicles. Dichlorobisdi-n-butylsulfidepalladium (II) is preferred among the last-mentioned compounds for the reasons that it is miscible in all proportions at room temperature with such widely divergent vehicles as chloroform, carbon tetrachloride, petroleum ether, hetpane, kerosene, benzene, toluene, nitrobenzene, methanol, butanol, benzyl alcohol, Cellosolve, butyl Cellosolve, acetone, methyl ethyl ketone, cyclohexanone, ethyl acetate, butyl acetate, ethyl ether, turpentine, pinene, terpineol, eugenol, cedrol, oil of camphor, oil of clove, oil of lavender (imitation) and oil of spike, and forms a metallic film at a temperature about 50° C. below that required for palladium resinate.

The vehicles of the palladium decorating compositions of the invention are important and the choice of the vehicle controls the behavior of the composition before firing, the particular vehicle used being determined by the method by which the compositions are to be applied. In addition to simple solvents such as those previously disclosed, the vehicle includes mixtures of essential oils, terpenes, resins and the like, carefully chosen to impart specific physical properties to the composition. These properties, such as oiliness, viscosity, evaporation rate, surface tension and tack will vary for different methods of application such as brushing, spraying, stippling, stamping, printing, both direct and offset, hot or cold screen printing, stenciling, decalcomania, and the like. Typical vehicles include mixtures of two or more of the following ingredients: methyl ethyl ketone, cyclohexanone, ethyl acetate, amyl acetate, Cellosolve, butanol, nitrobenzene, toluene, xylene, petroleum ether, chloroform, carbon tetrachloride, various terpenes such as pinene, dipentene, and the like, essential oils, such as oils of lavender, rosemary, aniseed, sassafras, wintergreen, fennel and turpentine, Assyrian asphalt, various rosins and balsams, and synthetic resins. It is an outstanding advantage of the preferred palladium compounds of this invention that they are soluble in such a wide range of vehicles. This permits a very wide latitude in the choice of the vehicles and permits the use of desirable ingredients such as lacquers, synthetic resins and the like that are not commonly incorporated into palladium decorating compositions.

In a preferred embodiment, the palladium decorating compositions contain a flux for the palladium in addition to the organic vehicle and the bisthioether palladous salt coordination compound. The choice of ingredients for the flux determines the behavior of the palladium film during and after firing, and is usually dictated by the composition of the article to be decorated and the use for which it is intended. The flux will usually contain small amounts of salts or resinates of rhodium or iridium to improve the continuity and brilliance of the palladium film. Other ingredients such as salts and resinates of bismuth, chromium, lead, cadmium, tin, copper, cobalt, antimony and uranium are employed to improved the adherence of the palladium film and its resistance to abrasion. The ingredients fuse to a low melting glass or glaze as a result of the firing. The conventional glazes cannot be used to promote adherence of palladium film to non-refractory materials such as plastics and plastic laminates, and the palladium film on such material may be protected, if desired, by a coating of lacquer or varnish, or by laminating a thin film of plastic to the surface. A lacquer may also be incorporated in the palladium decorating composition to provide an adherent film.

The bisthioether palladous salt coordination compounds of the present invention are compounds of the formula

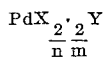

where X is an anion, $n$ is the valence of the anion, Y is a thioether and $m$ is an integer from 1 to 10 inclusive representing the number of sulfide linkages in the thioether.

Representative bisthioether palladous salt coordination compounds useful in the palladium decorating compositions of the invention are listed in Table I as follows. The nomenclature used is that used in "Gmelins, Handbook of Inorganic Chemistry," 8th edition, part 65, section 2, pages 405–412, published 1942 by Verlag Chemie, G.m.b.H., Weinhein/Bergstr. and Berlin, Germany.

can be prepared by a process involving causing a thioether to react with a palladous salt under anhydrous or substantially anhydrous conditions, i.e., in the absence or substantial absence of water. By reason of carrying out the reaction under anhydrous or substantially anhydrous conditions, considerable improvement is attained in the process as follows: (1) elimination of the considerable expense of being required to remove water from the product, (2) elimination of expensive requirements of time, apparatus, and labor for preparation of the aqueous solutions, and (3) less troublesome. It was indeed surprising and unexpected that the reaction could be carried out in the absence of water in view of the low solubilities of the simple palladous salts. The reaction may be accomplished in the presence of an anhydrous solvent such as chloroform or toluene, if desired.

Thioethers which can be reacted in accordance with the present invention include di-n-butyl sulfide, dimethyl sulfide, di-n-propyl sulfide, diisopropyl sulfide, diisobutyl sulfide, di-sec-butyl sulfide, di-n-octyl sulfide, di-n-tetradecyl sulfide, diphenylsulfide, dibenzyl sulfide, methyl-p-tolyl sulfide, di-alpha-methylbenzyl sulfide, trimethylene sulfide, tetrahydrothiophene, 1,4 - thioxane; 2,5 - dithiahexane; 2,7-dithiaoctane, ethylmercapto ethanol, thiodiglycolicacid, n-butylmethyl sulfide and n-butylethyl sulfide. Palladous salts which can be reacted include palladous chloride, palladous iodide, palladous bromide, palladous nitrate, palladous nitrite, palladous sulfate and palladous oxalate.

The temperature for carrying out the reaction between the thioether and palladous salt can be varied over a wide range from a low temperature above the freezing point of the solvent or of the thioether if no solvent is utilized, to about 150° C., preferably not higher than 100° C. Temperatures in excess of 150° C. should be avoided to prevent decomposition of the reaction product. The reaction is exothermic, and hence cooling may be required to maintain the temperature within the ranges disclosed. It may be advantageous to add the reactants slowly or in increments to avoid excess temperature increase due to the reaction, which is rapid.

TABLE 1

| Compound Number | Compound | Formula | Melting point, °C. |
|---|---|---|---|
| 1 | Dichlorobisdimethylsulfidepalladium (II) | PdCl$_2$·2(CH$_3$)$_2$S | 126.5–128.5 |
| 2 | Dichlorobisdi-n-propylsulfidepalladium (II) | PdCl$_2$·2(C$_3$H$_7$)$_2$S | 59 |
| 3 | Dichlorobisdiisopropylsulfidepalladium (II) | PdCl$_2$·2[(CH$_3$)$_2$CH]$_2$S | 162–164 |
| 4 | Dichlorobisdi-n-butylsulfidepalladium (II) | PdCl$_2$·2(C$_4$H$_9$)$_2$S | 30.5–31 |
| 5 | Dibromobisdi-n-butylsulfidepalladium (II) | PdBr$_2$·2(C$_4$H$_9$)$_2$S | 54–55 |
| 6 | Diiodobisdi-n-butylsulfidepalladium (II) | PdI$_2$·2(C$_4$H$_9$)$_2$S | 51–52 |
| 7 | Dinitratobisdi-n-butylsulfidepalladium (II) | Pd(NO$_3$)$_2$·2(C$_4$H$_9$)$_2$S | oil |
| 8 | Dinitritobisdi-n-butylsulfidepalladium (II) | Pd(NO$_2$)$_2$·2(C$_4$H$_9$)$_2$S | 169–170 |
| 9 | Sulfatobisdi-n-butylsulfidepalladium (II) | PdSO$_4$·2(C$_4$H$_9$)$_2$S | 92–94 |
| 10 | Oxalatobisdi-n-butylsulfidepalladium (II) | Pd(COO$^-$)$_2$·2(C$_4$H$_9$)$_2$S | [1] 112–113 |
| 11 | Dichlorobisdiisobutylsulfidepalladium (II) | PdCl$_2$·2[(CH$_3$)$_2$CHCH$_2$]$_2$S | 94–95 |
| 12 | Dichlorobisdi-sec-butylsulfidepalladium (II) | PdCl$_2$·2[CH$_3$CH$_2$(CH$_3$)CH]$_2$S | 75–76 |
| 13 | Dichlorobisdi-n-octylsulfidepalladium (II) | PdCl$_2$·2(C$_8$H$_{17}$)$_2$S | oil |
| 14 | Dichlorobisdi-n-tetradecylsulfidepalladium (II) | PdCl$_2$·2(C$_{14}$H$_{29}$)$_2$S | 50–52 |
| 15 | Dichlorobisdiphenylsulfidepalladium (II) | PdCl$_2$·2(C$_6$H$_5$)$_2$S | 170–172 |
| 16 | Dichlorobisdibenzylsulfidepalladium (II) | PdCl$_2$·2(C$_6$H$_5$CH$_2$)$_2$S | 154 |
| 17 | Dichlorobismethyl-p-tolylsulfidepalladium (II) | PdCl$_2$·2 p-CH$_3$C$_6$H$_4$SCH$_3$ | 164–165 |
| 18 | Dichlorobisdi-alpha-methylbenzylsulfidepalladium (II) | PdCl$_2$·2[C$_6$H$_5$(CH$_3$)CH]$_2$S | 175–176 |
| 19 | Dichlorobistrimethylenesulfidepalladium (II) | PdCl$_2$·2 $\overline{\text{CH}_2\text{SCH}_2\text{CH}_2}$ | 124–127 |
| 20 | Dichlorobistetrahydrothiophenepalladium (II) | PdCl$_2$·2 $\overline{\text{CH}_2\text{SCH}_2\text{CH}_2\text{CH}_2}$ | 179–180 |
| 21 | Dichlorobis-1,4-thioxanepalladium (II) | PdCl$_2$·2 $\overline{\text{CH}_2\text{SCH}_2\text{CH}_2\text{OCH}_2}$ | 205–206 |
| 22 | Dichloro-2,5-dithiahexanepalladium (II) | PdCl$_2$·CH$_3$SCH$_2$CH$_2$SCH$_3$ | 238–239 |
| 23 | Dichloro-2,7-dithiaoctanepalladium (II) | PdCl$_2$·CH$_3$SCH$_2$CH$_2$CH$_2$CH$_2$SCH$_3$ | 235 |
| 24 | Dichlorobisethylmercaptoethanolpalladium (II) | PdCl$_2$·2C$_2$H$_5$SCH$_2$CH$_2$OH | 51 |
| 25 | Dichlorobisthiodiglycolicacidpalladium (II) | PdCl$_2$·2(HOOCCH$_2$)$_2$S | [1] 215 |
| 26 | Sulfato-2,5-dithiahexanepalladium (II) | PdSO$_4$·CH$_3$SCH$_2$CH$_2$SCH$_3$ | |
| 27 | Dichlorodiethylsulfidedi-n-butylsulfidepalladium (II) | PdCl$_2$·(C$_2$H$_5$)$_2$S·(C$_4$H$_9$)$_2$S | Oil |
| 28 | Dichlorobis-n-butylmethylsulfidepalladium (II) | PdCl$_2$·2C$_4$H$_9$SCH$_3$ | Oil |
| 29 | Dichlorobis-n-butylethylsulfidepalladium (II) | PdCl$_2$·2C$_4$H$_9$SC$_2$H$_5$ | Oil |

[1] Decomposition.

It has been found in accordance with the invention that the bisthioether palladous salt coordination compounds It is preferred to employ about two moles of the thioether, or in the case of thioethers containing more than one sulfide linkage an equivalent amount based on the number of sulfide linkages present, per mole of the palladous salt. If a greater amount of thioether is used, the reaction product will contain the excess thioether, and if a lesser amount of thioether is used, the reaction product will contain unreacted palladous salt. It is particularly advantageous to employ a slight excess of the palladous salt, which may be filtered from the reaction mixture to give a very pure bisthioether palladous salt coordination compound in the filtrate. Reaction products may be purified, if desired, by crystallization or elution, but such purification is not usually necessary. Pure thioethers are not essential to the practice of the invention, and mixtures of thioethers may be employed to give palladous salt coordination compounds of mixed thioethers suitable for use in palladium decorating compositions.

The following examples illustrate the novel and improved process of the invention for preparing the bisthioether palladous salt coordination compounds by causing a thioether to react with a palladous salt under substantially anhydrous conditions. Parts and percentages are by weight unless otherwise specified. The products described were used without further purification in the preparation of palladium decorating compositions.

EXAMPLE I

Palladous chloride in amount of 35.36 parts (0.2 mole) was added in small increments during one hour to 58.52 parts (0.4 mole) of di-n-butylsulfide with stirring at about 60° C. The mixture was stirred in the absence of water at about 60° C. for 5 hours and filtered while warm from a little unreacted palladous chloride. The filtrate was 92.91 grams of dichlorobisdi-n-butylsulfidepalladium (II) as a dark amber oil that solidified on cooling to room temperature, contained 22.51 percent palladium and had a melting point of 30.5–31° C.

EXAMPLE II

To a solution of 13.66 parts dimethylsulfide (0.22 mole) in 150 parts by volume of chloroform was added 17.73 parts palladous chloride (0.10 mole) in increments in the absence of water with stirring and intermittent cooling in an ice bath to maintain the temperature between 10 and 15° C. during ¾ hour. The mixture was stirred in the absence of water for ½ hour longer without cooling, during which time the temperature increased to 22° C., and was filtered from a trace of insoluble material. The clear amber filtrate was heated in an open dish on a steam bath with occasional stirring during 4 hours until the weight was substantially constant. The residue was 29.73 parts of dichlorobisdimethylsulfidepalladium (II) as orange crystals, M.P. 126.5–128.5° C., containing 35.10 percent palladium.

EXAMPLE III

To 51.70 parts di-n-octylsulfide (0.20 mole) was added 18.8 parts palladous chloride (0.102 mole) in increments in the absence of water with stirring at 75–80° C. during 35 minutes. The mixture was stirred at this temperature for 3 hours longer in the absence of water and was filtered from a little insoluble solid. The filtrate was 67.97 parts of dichlorobisdi-n-octylsulfidepalladium (II) as a moderately viscous, dark amber oil containing 15.25 percent palladium that had excellent solubility in a wide range of organic decorating vehicles.

EXAMPLE IV

To a mixture of 61.44 parts di-n-butylsulfide (0.42 mole) and 34.28 parts diethylsulfide (0.38 mole) was added 74.59 parts palladous chloride (0.42 mole) in increments in the absence of water during ¼ hour with intermittent cooling to maintain the temperature between 40 and 50° C. The mixture, which was free of water, was stirred at about 50° C. for 2 hours and was filtered from a little insoluble solid. The filrate was 159.3 parts of a moderately viscous, dark amber oil that was predominantly dichlorodiethylsulfidedi - n - butylsulfidepalladium (II), contained 26.12 percent palladium and had excellent solubility in a wide range of organic decorating vehicles.

EXAMPLE V

To 47.30 parts n-butylethylsulfide (0.4 mole) was added 37.30 parts palladous chloride (0.21 mole) in increments in the absence of water during 15 minutes with stirring and intermittent cooling to maintain the temperature between 45 and 55° C. The mixture was stirred at about 55° C. for 1 hour and was filtered. The filtrate was 82.67 parts of dichlorobis-n-butylethylsulfidepalladium (II) as a moderately viscous, dark amber oil that contained 26.34 percent palladium and had excellent solubility in a wide range of organic decorating vehicles.

EXAMPLE VI

Dichlorobis-n-butylmethylsulfidepalladium (II) was prepared substantially as described in Example V from 41.58 parts n-butylmethylsulfide (0.4 mole) and 37.30 parts palladous chloride (0.21 mole). The product was 77.53 parts of a moderately viscous, dark amber oil containing 28.12 percent palladium that had excellent solubility in a wide range of organic decorating vehicles.

EXAMPLE VII

Dibromobisdi-n-butylsulfidepalladium (II) is prepared following the procedure substantially as described in Example I employing palladous bromide instead of palladous chloride in amount of 53.31 parts (0.2 mole) and 58.52 parts di-n-butylsulfide (0.4 mole).

EXAMPLE VIII

Dinitratobisdi-n-butylsulfidepalladium (II) is prepared following the procedure substantially as described in Example I using palladous nitrate instead of palladous chloride in amount of 46.14 parts (0.2 mole) and 53.31 parts di-n-butylsulfide (0.4 mole).

Palladium decorating compositions in which palladium is the only precious metal present or in which relatively minor amounts of rhodium or iridium are present in addition to the palladium have many uses, particularly where specific electrical properties or ease of soldering are desired in the fired film. For many applications, however, decorating compositions that also contain other precious metals such as gold, platinum or silver are preferred. Various effects may be obtained with compositions containing mixtures of palladium and gold. Discernible effects are produced by incorporating as little as about one part of palladium to one hundred parts of gold by weight in a liquid bright gold. Thus the fired film obtained from a liquid bright gold containing 7 percent gold and 0.7 percent palladium is appreciably more yellow than the same composition without the palladium. Compositions containing about one part of palladium to 20 parts of gold by weight give silvery fired films with the appearance of white gold. The appearance of the fired film becomes somewhat darker in color with increasing proportions of palladium to gold, and proportions of more than 3 parts of palladium to 7 parts of gold by weight are not ordinarily used for purely decorative purposes. Such higher proportions are useful however, for electrical purposes to give films with particular resistance values and having a low temperature coefficient of resistance. For such purposes, weight ratios of palladium to gold ranging from about 1:100 to 100:1 may be used. Where such combinations with gold are desired, the bisthioether palladous salt coordination compounds may be combined with liquid bright golds of the type described by Chemnitius, J. Prakt. Chem. 117, 245 (1927), and by Ballard, U.S. Patent 2,490,399. Preferably, however, they are combined with the improved liquid bright golds of the type described in U.S. Patent 2,984,575. In a similar manner, bisthioether palladous salt coordination compounds may be combined with liquid bright platinums of the type described by Chemnitius, Sprechsaal 60, 226 (1927), or preferably of the type described in U.S. Patent 3,022,177, to give compositions forming films having useful esthetic and electrical properties. Compositions containing palladium, platinum and gold may also be employed, and a composition containing these elements in the ratio of about 1 part palladium, 6 parts platinum and 17 parts gold by weight gives a fired film having outstanding brilliance and durability. In addition to combinations with liquid bright gold and platinum, the bisthioether palladous salt coordination compounds may be formulated in compositions containing other materials such as finely divided gold, platinum or silver metal or salts or resinates of base metals such as lead, aluminum, bismuth, silicon or iron to give fired films having specific electrical properties.

Burnish palladiume decorating compositions are obtained by incorporating a bisthioether palladous salt coordination compound in a burnish gold decorating composition. Conventional burnish gold decorating compositions containing finely divided metallic gold such as those described by F. Chemnitius, J. Prakt. Chem. 117, 245 (1927); by K. H. Ballard, U.S. Patent 2,383,704, and by G. S. Chandra, British Patent 721,906, may be employed. Preferably, however, lower firing compositions such as those described in U.S. Patent 2,984,575 and U.S. Patent 2,994,614, are used. The burnish palladium decorating compositions give somewhat matte films that after burnishing have a soft lustrous appearance rather than the bright metallic appearance of the films obtained from the bright palladiums. Burnish palladium decorating compositions giving films with excellent conductivity and solderability may also be obtained without the use of gold by using paste compositions of the less soluble bisthioether palladous salt coordination compounds. Generally speaking, compounds number 2, 4, 5, 6, 7, 11, 12, 13, 14, 27, 28 and 29 of Table I, are best suited to making liquid bright palladium decorating compositions; while compounds number 1, 3, 8, 9, 10, 15, 16, 17, 18, 19, 20, 21, 22, 23, 24, 25 and 26 of Table I, are best suited for making burnish palladium decorating compositions, although some of the compounds may be used for either purpose depending on the concentration of palladium desired and the vehicle used.

As is seen from the foregoing discussion, the amount of palladium in a palladium decorating composition may vary widely, depending on the use for which the composition is intended. The preferred palladium decorating compositions of this invention contain bisthioether palladous salt coordination compounds in amounts giving palladium concentrations in the composition ranging from about 0.05 percent to 20 percent or move by weight.

The precious metal decorating compositions of the present invention are applied to the particular article or articles to be decorated by brushing, spraying, screening, or by other suitable methods known to those skilled in the art. After application, the composition is fired to a metallic palladium form. Typically, the firing will produce an adherent bright metallic palladium-containing film. However, when decorating thermoplastic articles, the thermoplastic articles normally cannot be heated for a sufficient time to cause the palladium to adhere to the article for the reason that the thermoplastic tends to deform or melt on prolonged heating. Thus, the palladium typically will not adhere to the thermosplastic article after heating and it is necessary to apply a coating of lacquer or varnish, or to laminate a thin film of plastic over the decoration on the article's surface to cause the palladium film to adhere to the article's surface.

Firing temperatures employed range between about 100° and 1200° C., preferably between about 200° and 900° C. Of course, the particular firing temperature employed will depend on the substrate being decorated, and will be considerably lower when decorating thermoplastic materials than when decorating ceramics or ferrous metals such as stainless steel. The firing is usually carried out to the incipient softening point of the substrate. Temperatures much above 120° C. are not satisfactory because such temperatures tend to result in agglomerating the metal in small discrete particles and hence destroying the continuity of the applied film, while temperatures much below 100° C. do not result in a metallic palladium-containing film. Temperatures of between about 100° and 250° C. are advantageous for firing the applied decorating composition on thermoplastic articles, and temperatures between about 350° and 750° C. are advantageous for firing the applied decorating material on glass. Firing temperatures between about 450° and 700° C. are advantageously used for firing the decorating material on stainless steel, and firing temperatures between about 350° and 900° C. are advantageously used when firing the decorating material on porcelain and glazed earthware. The firing is carried out for a time sufficient to decompose the palladous salt coordination compound and volatilize the decomposition products. By the term "ceramic" article used herein is meant an article or body of glass, porcelain, terra cotta or other ceramic ware.

The following examples illustrate the palladium decorating compositions and the decorating method of the invention.

EXAMPLE IX

Bright palladium decorating compositions

A. As an example of a bright palladium decorating composition suitable for brushing containing a bisthioether palladous salt coordination compound and a gold tertiary mercaptide liquid bright gold, a mixture of the following ingredients was prepared.

| Ingredient: | Parts by weight |
|---|---|
| Dichlorobisdi-n-butysulfidepalladium (II) dissolved in toluene (15 percent Pd) | 10.0 |
| Gold tert.-dodecylmercaptide dissolved in heptane (30 percent Au) | 30.0 |
| Rhodium resinate dissolved in a mixture of essential oils and hydrocarbons (1 percent Rh) | 5.0 |
| Bismuth resinate dissolved in a mixture of essential oils (4.5 percent Bi) | 7.0 |
| Chromium resinate dissolved in a mixture of cyclohexanone and oil of turpentine (2.05 percent Cr) | 2.0 |
| Asphalt dissolved in oil of turpentine (30 percent asphalt) | 14.3 |
| Rosin dissolved in oil of turpentine (50 percent rosin) | 14.3 |
| Chloroform | 10.0 |
| Nitrobenzene | 7.0 |
| Oil soluble red dye | 0.4 |
| Total | 100.0 |

The preparation of the gold tert.-dodecylmercaptide is descriped in Example VIIB of co-pending U.S. patent application Serial No. 727,524, filed April 9, 1958. The dark amber solution thus obtained contained 1.5 percent palladium, 9 percent gold, 0.05 percent rhodium, 0.32 percent bismuth, 0.04 percent chromium, 4.3 percent asphalt and 7.2 percent rosin. It was applied by brushing on soda lime clear glass tumblers, which were fired to 600° C. in a continuous lehr on a one and one-fired to 600° C. in a continuous lehr on a one and one-fourth hour cycle. A bright adherent silvery mirror was obtained that was highly conductive and could be soldered.

It was also brushed on a silicone plastic fiberglass laminate known as Formica G-7, which was fired at about 250° C. for about 45 minutes under an infrared heat source. A bright adherent conductive silvery mirror was obtained.

The same composition was applied by brushing to various articles, which were heated in a kiln to a specified firing temperature, held at this temperature for 10 minutes and then slowly cooled. In every case a conductive, adherent silvery film was obtained. The appearance of the films varied somewhat with the nature of the underlying surface and are summarized below.

| Article | Firing temperature, ° C. | Appearance of film |
|---|---|---|
| Quartz crystal | 450 | Bright. |
| Sawed quartz | 450 | Matte. |
| Pressed mica | 450 | Do. |
| Aluminum Al-2-S panel | 450 | Semi-bright. |
| Stainless steel panel, type 321 | 600 | Do. |
| Stainless steel sheet, type 430 | 600 | Bright. |
| Titanium metal panel unpolished surface. | 600 | Matte. |
| White porcelain enamel on steel | 600 | Bright. |
| Soda lime clear glass tumbler | 600 | Do. |
| Soda lime clear glass bottle | 600 | Do. |
| Tempered soda lime opal glass dish | 600 | Do. |
| Borosilicate opal glass dish | 650 | Do. |
| Borosilicate clear glass tubing | 650 | Do. |
| A glass composition known as Pyroceram. | 740 | Do. |
| Glazed earthenware dish | 740 | Do. |
| Hard porcelain dish | 740 | Do. |

B. A liquid bright gold was prepared by mixing the following ingredients.

Ingredient: Parts by weight
Gold ter.-dodecylmercaptide dissolved in heptane (30 percent Au) _____ 45.0
Rhodium resinate dissolved in a mixture of essential oils and hydrocarbons (1 percent Rh) _____ 7.5
Bismuth resinate dissolved in a mixture of essential oils (4.5 percent Bi) _____ 10.5
Chromium resinate dissolved in a mixture of cyclohexanone and oil of turpentine (2.05 percent Cr) _____ 3.0
Asphalt dissolved in oil of turpentine (30 percent asphalt) _____ 21.5
Rosin dissolved in oil of turpentine (50 percent rosin) _____ 21.4
Chloroform _____ 4.5
Nitrobenzene _____ 10.5
Oil soluble red dye _____ 0.6

Total _____ 124.5

To 8.30 gram portions of the resulting dark red solution were added amounts of compounds number 2, 5, 6, 7, 11, 12, 13, 14, 27, 28 and 29 of Table I equivalent to 0.15 gram palladium and enough chloroform to bring the total weight of the compositions to 10.00 grams. The resulting palladium decorating compositions were thus substantially identical with the composition of A above except for the substitution of various bisthioether palladous salt coordination compounds for the dichlorobisdi-n-butylsulfidepalladium (II) of A. These compositions were applied by brushing to soda lime clear glass tumblers, which were fired to 600° C. in a continuous lehr on a one and one-fourth hour cycle, and to glazed ceramic tiles, which were heated in a kiln to 740° C., held at this temperature for 10 minutes and then slowly cooled. The appearance of the adherent silvery films obtained is tabulated below. All films were highly conductive and solderable.

| Bisthioether palladous salt coordination compound used | Appearance of film on soda lime glass | Appearance of film on glazed ceramic tile |
|---|---|---|
| Dichlorobisdi-n-propyl-sulfidepalladium (II). | Bright | Bright. |
| Dibromobisdi-n-butyl-sulfidepalladium (II). | do | Do. |
| Diiodobisdi-n-butyl-sulfidepalladium (II). | Matte (bright when burnished). | Matte (bright when burnished). |
| Dinitratobisdi-n-butyl-sulfidepalladium (II). | do | Do. |
| Dichlorobisdiisobutyl-sulfidepalladium (II). | Bright | Bright. |
| Dichlorobisdi-sec-butyl-sulfidepalladium (II). | do | Do. |
| Dichlorobisdi-n-octyl-sulfidepalladium (II). | do | Do. |
| Dichlorobisdi-n-tetradecyl-sulfidepalladium (II). | do | Do. |
| Dichlorodiethylsulfide-di-n-butyl-sulfidepalladium (II). | do | Do. |
| Dichlorobis-n-butylmethyl-sulfidepalladium (II). | do | Do. |
| Dichlorobis-n-butylethyl-sulfidepalladium (II). | do | Do. |

C. As an example of a bright palladium decorating composition in a lacquer containing vehicle, a mixture of the following ingredients was prepared.

Ingredients: Parts by weight
Dichlorobisdi-n-butylsulfidepalladium (II) dissolved in toluene (15 percent Pd) _____ 2.50
Gold tert.-dodecylmercaptide dissolved in heptane (30 percent Au) _____ 7.50
Rhodium resinate dissolved in a mixture of essential oils and hydrocarbons (1 percent Rh) _____ 1.25
Bismuth resinate dissolved in a mixture of essential oils (4.5 percent Bi) _____ 1.75
Chromium resinate dissolved in a mixture of cyclohexanone and oil of turpentine (2.05 percent Cr) _____ 0.50
Nitrocellulose dissolved in a mixture of dibutyl phthalate and benzyl benzoate (2-percent nitrocellulose) _____ 7.15
Chloroform _____ 2.50
Nitrobenzene _____ 1.75
Oil soluble red dye _____ 0.10

Total _____ 25.00

The dark amber solution thus obtained contained 1.5 percent palladium, 9 percent gold, 0.05 percent rhodium, 0.32 percent bismuth, 0.04 percent chromium and 0.57 percent nitrocellulose. It was applied by brushing to soda lime clear glass tumblers, which were fired to 600° C. in a continuous lehr on a one and one-fourth hour cycle. A semi-bright, adherent silvery mirror was obtained that was highly conductive and could be soldered.

D. As an example of a bright palladium decorating composition suitable for spraying, the composition of A above was diluted with an equal weight of chloroform. The solution thus obtained was sprayed on soda lime clear glass tumblers, which were fired to 600° C. in a continuous lehr on a one and one-fourth hour cycle. A bright, adherent silvery mirror was obtained that was highly conductive and could be soldered.

E. As an example of a bright palladium decorating composition suitable for stamping, machine banding and screening, 20 parts by weight of the composition of A above was heated in an open dish on a steam bath with occasional stirring until 10.5 parts by weight had evaporated. The residual 9.5 parts by weight was a dark viscous oil. This was applied by stamping and by screening through 230 mesh and 304 mesh nylon screens to flat window glass and by machine banding to soda lime clear glass tumblers. The test pieces were fired to 600° C. in a continuous lehr on a one and one-fourth hour cycle. In every case, bright, adherent, conductive, silvery mirrors were obtained.

EXAMPLE X

Bright palladium decorating composition

As an example of a bright palladium decorating composition containing a bisthioether palladous salt coordination compound and a gold resinate liquid bright gold, a mixture of the following ingredients was prepared.

| Ingredient: | Parts by weight |
|---|---|
| Dichlorobisdi-n-butylsulfidepalladium (II) dissolved in toluene (15 percent Pd) | 2.5 |
| Gold resinate dissolved in a mixture of essential oils (24 percent Au) | 9.4 |
| Rhodium resinate dissolved in a mixture of essential oils and hydrocarbons (1 percent Rh) | 1.2 |
| Bismuth resinate dissolved in a mixture of essential oils (4.5 percent Bi) | 1.8 |
| Chromium resinate dissolved in a mixture of cyclohexanone and oil of turpentine (2.05 percent Cr) | 0.5 |
| Asphalt dissolved in oil of turpentine (30 percent asphalt) | 2.6 |
| Rosin dissolved in oil of turpentine (50 percent rosin) | 2.6 |
| Chloroform | 2.5 |
| Nitrobenzene | 1.8 |
| Oil soluble red dye | 0.1 |
| Total | 25.0 |

The dark amber solution thus obtained contained 1.5 percent palladium, 9 percent gold, 0.05 percent rhodium, 0.32 percent bismuth, 0.04 percent chromium, 3.1 perment asphalt and 5.2 percent rosin. It was applied by brushing on soda lime clear glass tumblers, which were fired to 600° C. in a continuous lehr on a one and one-fourth hour cycle. A bright, adherent silvery mirror was obtained that was highly conductive and could be soldered.

EXAMPLE XI

Bright palladium decorating composition

As an example of a bright palladium decorating composition containing a bisthioether palladous salt coordination compound and a gold terpene mercaptide liquid bright gold, the composition of Example X was prepared, substituting a toluene solution containing 24 percent gold in the form of gold pinene mercaptide, prepared as described in Example I of U.S. Patent No. 2,490,399, for the solution of gold resinate. When applied and fired as described in Example X, the composition gave substantially identical results.

EXAMPLE XII

Thermoplastic bright palladium decorating composition

As an example of a thermoplastic bright palladium decorating composition containing a bisthioether palladous salt coordination compound, a mixture of the following ingredients was prepared.

| Ingredient: | Parts by weight |
|---|---|
| The bright palladium decorating composition described in Example IX-A | 15.0 |
| Rosin Amine D salt of 2-ethyl hexoic acid | 2.6 |
| Staybelite resin | 2.0 |
| Stearic acid | 2.6 |
| Armid HT | 4.8 |
| Total | 27.0 |

The mixture was heated in an open dish under an infrared lamp with occasional stirring until 9.4 parts by weight had evaporated. The residual 17.6 parts by weight was a dark solid at room temperature and became a viscous oil on heating to about 60° C. When the composition was screened on a soda lime glass bottle through an electrically heated stainless steel screen maintained at between 60° and 77° C., the film obtained immediately set to a hard tack-free state. A bright, adherent, conductive, silvery mirror was obtained when the bottle was fired to 600° C. in a continuous lehr on a one and one-fourth hour cycle.

Thermoplastic decorating vehicles for precious metal decorating compositions are more fully described in U.S. Patent 3,092,504 of Robert C. Langley and David B. Kellum. Rosin Amine D is a primary amine made from a modified rosin produced by the Hercules Powder Company. It is fully described in their booklet, "Rosin Amine D and Its Derivatives," published in 1950. The Rosin Amine D salt of 2-ethyl hexoic acid is obtained by warming a mixture of equimolar parts of Rosin Amine D and 2-ethyl hexoic acid. Staybelite Resin is a hydrogenated rosin manufactured by the Hercules Powder Company and described in their booklet "Staybelite Resin," published in 1946. Armid HT is a synthetic wax composed of amides of hexadecane, octadecane and octadecene sold by Armour and Company.

EXAMPLE XIII

Bright palladium decorating compositions

A. As an example of a bright palladium decorating composition containing a bisthioether palladous salt coordination compound and a halogenoplatinous mercaptide-alkyl sulfide complex liquid bright platinum, a mixture of the following ingredients was prepared.

| Ingredient: | Parts by weight |
|---|---|
| Dichlorobisdi-n-butylsulfide palladium (II) dissolved in toluene (15 percent Pd) | 2.50 |
| Chloroplatinous n-octylmercaptide-ethyl sulfide dissolved in chloroform (20 percent Pt) | 3.75 |
| Rhodium resinate dissolved in a mixture of essential oils and hydrocarbons (1 percent Rh) | 1.25 |
| Bismuth resinate dissolved in a mixture of essential oils (4.5 percent Bi) | 1.75 |
| Chromium resinate dissolved in a mixture of cyclohexanone and oil of turpentine (2.05 percent Cr) | 0.50 |
| Asphalt dissolved in oil of turpentine (30 percent asphalt) | 5.45 |
| Rosin dissolved in oil of turpentine (50 percent rosin) | 5.45 |
| Chloroform | 2.50 |
| Nitrobenzene | 1.75 |
| Oil soluble red dye | 0.10 |
| Total | 25.00 |

The chloroplatinous n-octylmercaptide-ethyl sulfide was prepared as described in Example XVIII of U.S. patent application Serial No. 4,212, filed January 25, 1960. The dark amber solution thus obtained contained 1.5 percent palladium, 3 percent platinum, 0.05 percent rhodium, 0.32 percent bismuth, 0.04 percent chromium, 6.5 percent asphalt and 10.9 percent rosin. It was applied by brushing on soda lime clear glass tumblers, which were fired to 600° C. in a continuous lehr on a one and one-fourth hour cycle. A bright, adherent, dark silvery mirror was obtained that was highly conductive and could be soldered.

B. As an example of a bright palladium decorating composition containing a bisthioether palladous salt coordination compound and a platinum resinate liquid bright platinum, a mixture of the following ingredients was prepared.

| Ingredient: | Part by weight |
|---|---|
| Dichlorobisdi-n-butylsulfidepalladium (II) dissolved in toluene (15 percent Pd) | 2.50 |
| Platinum resinate dissolved in a mixture of essential oils (12 percent Pt) | 6.25 |
| Rhodium resinate dissolved in a mixture of essential oils and hydrocarbons (1 percent Rh) | 1.25 |
| Bismuth resinate dissolved in a mixture of essential oils (4.5 percent Bi) | 1.75 |
| Chromium resinate dissolved in a mixture of cyclohexanone and oil of turpentine (2.05 percent Cr) | 0.50 |
| Asphalt dissolved in oil of turpentine (30 percent asphalt) | 4.20 |
| Rosin dissolved in oil of turpentine (50 percent rosin) | 4.20 |
| Chloroform | 2.50 |
| Nitrobenzene | 1.75 |
| Oil soluble red dye | 0.10 |
| Total | 25.00 |

The dark amber solution thus obtained contained 1.5 percent palladium, 3 percent platinum, 0.05 percent rhodium, 0.32 percent bismuth, 0.04 percent chromium, 5 percent asphalt and 8.4 percent rosin. It was applied by brushing on glazed earthenware dishes, whch were heated in a kiln of 740° C., held at this temperature for 10 minutes and then slowly cooled. A bright, adherent, conductive, silvery mirror was obtained.

EXAMPLE XIV

*Bright palladium decorating composition*

As an example of an influxed bright palladium decorating composition containing a bisthioether palladous salt coordination compound, a mixture of the following ingredients was prepared.

| Ingredient: | Parts by weight |
|---|---|
| Dichlorobisdi-n-butylsulfidepalladium (II) dissolved in toluene (15 percent Pd) | 20 |
| Xylene | 30 |
| Oil of camphor | 50 |
| Total | 100 |

The resulting clear amber solution containing 3 percent palladium was brushed on epoxy plastic fiberglass laminate panels, which were heated at about 250° C. under an infrared heater for about 20 minutes. An adherent, conductive, solderable, bright silver mirror was obtained. A similar result was obtained when the composition was brushed on a silicone plastic fiberglass laminate known as Formica G-7, rapidly heated during 5 minutes to about 280° C. under an infrared heater and then cooled, although the appearance was not quite as bright.

EXAMPLE XV

*Palladium decorating compositions for high temperature applications*

As examples of palladium decorating compositions suitable for high temperature firing for electrical purposes, each of the following bisthioether palladous salt coordination compounds was milled in a roll mill with an equal weight of a 50 percent solution of rosin in oil of turpentine.

Compound:
 Dichlorobisdimethylsulfidepalladium (II)
 Dichlorobisdiisopropylsulfidepalladium (II)
 Dinitritobisdi-n-butylsulfidepalladium (II)
 Sulfatobisdi-n-butylsulfidepalladium (II)
 Oxalatobisdi-n-butylsulfidepalladium (II)
 Dichlorobisdiphenylsulfidepalladium (II)
 Dichlorobisdibenzylsulfidepalladium (II)

Compound—Continued
 Dichlorobismethyl-p-tolylsulfidepalladium (II)
 Dichlorobisdi-alpha-methylbenzylsulfidepalladium (II)
 Dichlorobistrimethylenesulfidepalladium (II)
 Dichlorobistetrahydrothiophenepalladium (II)
 Dichlorobis-1,4-thioxanepalladium (II)
 Dichloro-2,5-dithiahexanepalladium (II)
 Dichloro-2,7-dithiaoctanepalladium (II)
 Dichlorobisethylmercaptoethanolpalladium (II)
 Dichlorobisthiodiglycolicacidpalladium (II)

The resulting pastes were thinned to brushing consistency with oil of turpentine and brushed on impervious vitrified alumina disks, which were fired in a kiln to 900° C. and then slowly cooled. In every case, adherent, highly conductive, readily solderable films were obtained. After burnishing, the films had the characteristic appearance of burnished palladium.

EXAMPLE XVI

*Burnish palladium decorating compositions*

A. As an example of a burnished palladium decorating composition containing a bisthioether palladous salt coordination compound and metallic gold powder, a mixture of the following ingredients was prepared.

| Ingredient: | Parts by weight |
|---|---|
| Dichlorobisdi-n-butylsulfidepalladium (II) dissolved in toluene (15 percent Pd) | 32 |
| Fine gold powder | 40 |
| Mercuric oxide | 82 |
| Lead borate | 7.5 |
| Bismuth subnitrate | 2.5 |
| Rosin dissolved in oil of turpentine (50 percent rosin) | 20 |
| Total | 184 |

The mixture was ground in a roll mill to a smooth paste, which was thinned to brushing consistency with oil of turpentine and brushed on glazed ceramic tiles. The tiles were fired to 600° C. in a continuous lehr on a one and one-fourth hour cycle. A matte grey film was obtained that developed a soft silvery luster on burnishing with a fiberglass burnisher.

B. As an example of a burnish palladium decorating composition containing a bisthioether palladous salt coordination compound and a gold primary mercaptide, a mixture of the following ingredients was prepared.

| Ingredient: | Parts by weight |
|---|---|
| Dichlorobisdi-n-butylsulfidepalladium (II) dissolved in toluene (15 percent Pd) | 32 |
| Gold ethyl mercaptide | 50 |
| Rhodium resinate dissolved in a mixture of essential oils and hydrocarbons (1 percent Rh) | 10 |
| Lead borate | 7.5 |
| Bismuth subnitrate | 2.5 |
| Rosin dissolved in oil of turpentine (50 percent rosin | 98 |
| Total | 200 |

The mixture was ground in a roll mill to a smooth paste, which was thinned to brushing consistency with oil of turpentine and brushed on soda lime clear glass tumblers and on glazed ceramic tiles. The articles were fired to 600° C. in a continuous lehr on a one and one-fourth hour cycle. A matte grey film was obtained that developed a soft silvery luster on burnishing. A similar result was obtained when the tiles were heated in a kiln to 740° C., held at this temperature for 10 minutes and then cooled.

EXAMPLE XVII

Palladium luster decorating compositions

A. As an example of a palladium luster decorating composition containing a bisthioether palladous salt coordination compound, a mixture of the following ingredients was prepared.

| Ingredient: | Parts by weight |
|---|---|
| Dichlorobisdi-n-butylsulfidepalladium (II) dissolved in toluene (15 percent Pd) | 3.2 |
| Rhodium resinate dissolved in a mixture of essential oil and hydrocarbons (1 percent Rh) | 1.4 |
| Bismuth resinate dissolved in a mixture of essential oils (4.5 percent Bi) | 8.6 |
| Chromium resinate dissolved in a mixture of cyclohexanone and oil of turpentine (2.05 percent Cr) | 2.5 |
| Asphalt dissolved in oil of turpentine (30 percent asphalt) | 15.4 |
| Oil of turpentine | 16.7 |
| Oil soluble red dye | 0.2 |
| Total | 48.0 |

The dark red solution thus obtained contained 1 percent palladium, 0.029 percent rhodium, 0.8 percent bismuth, 0.11 percent chromium and 9.6 percent asphalt. It was applied by brushing and by spraying on soda lime clear glass tumblers, which were fired to 600° C. in a continuous lehr on a one and one-fourth hour cycle. An attractive, pale brown adherent film with a silvery iridescene (smoke luster) was obtained on the glass.

B. As an example of a palladium luster decorating composition containing a bisthioether palladous salt coordination compound and a silver resinate, a mixture of the following ingredients was prepared.

| Ingredient: | Parts by weight |
|---|---|
| Dichlorobisdi-n-butylsulfidepalladium (II) dissolved in t oluene (15 percent Pd) | 2.5 |
| Silver resinate dissolved in a mixture of essential oils and sulfurized rosin (24 percent Ag) | 3.1 |
| Rhodium resinate dissolved in a mixture of essential oils and hydrocarbons (1 percent Rh) | 1.2 |
| Bismuth resinate dissolved in a mixture of essential oils (4.5 percent Bi) | 1.8 |
| Chrominum resinate dissolved in a mixture of cyclohexanone and oil of turpentine (2.05 percent Cr) | 0.5 |
| Asphalt dissolved in oil of turpentine (30 percent asphalt) | 5.7 |
| Rosin dissolved in oil of turpentine (50 percent rosin) | 5.8 |
| Chloroform | 2.5 |
| Nitrobenzene | 1.8 |
| Oil soluble red dye | 0.1 |
| Total | 25.0 |

The resulting dark amber solution contained 1.5 percent palladium, 3 percent silver, 0.05 percent rhodium, 0.32 percent bismuth, 0.04 percent chrominum, 6.8 percent asphalt and 11.6 percent rosin. It was brushed on glazed ceramic dishes, which were heated in a kiln to 740° C., held at this temperature for 10 minutes and then slowly cooled. An attractive chocolate-brown, iridescent luster was obtained.

It will be obvious to those skilled in the art that many modifications may be made within the scope of the present invention without departing from the spirit thereof, and the invention includes all such modifications.

What is claimed is:

1. A palladium decorating composition comprising a dichlorobisdiprimaryalkylsulfidepalladium (II) compound wherein the diprimaryalkylsulfide contains at least 5 carbon atoms, an organic vehicle therefor, and a palladium flux.

2. A palladium decorating composition comprising a dichlorobisdiprimaryalkylsulfidepalladium (II) compound wherein the diprimaryalkylsulfide contains at least 5 carbon atoms, an organic vehicle therefor, and a palladium flux, the dichlorobisdiprimaryalkylsulfidepalladium (II) compound being present therein in amount equivalent to a palladium concentration in the range from about 0.05 percent to 20 percent by weight.

3. The decorating composition of claim 2 wherein the dichlorobisdiprimaryalkylsulfidepalladium (II) compound is dichlorobisdi-n-butylsulfidepalladium (II).

References Cited by the Examiner

UNITED STATES PATENTS

| 66,321 | 1/01 | Langhans | 106—1 XR |
| 1,954,353 | 4/34 | Ernst | 106—1 |
| 2,551,712 | 5/51 | Soby | 117—46 |
| 2,587,523 | 2/52 | Prescott | 117—46 |
| 2,835,686 | 5/58 | Graham | 260—429 |
| 2,839,552 | 6/58 | Shapiro et al. | 260—429 |
| 2,855,493 | 10/58 | Tierman | 201—73 |
| 2,883,288 | 4/59 | Dobbs et al. | 106—1 |
| 2,942,990 | 6/60 | Sullivan | 106—1 |
| 2,994,614 | 8/61 | Fitch | 106—1 |
| 3,092,504 | 6/63 | Langley et al. | 106—1 |

OTHER REFERENCES

Beilstein: Handbuch der Organischen Chemie, first tome, third edition, pp. 347 to 369.

Gmelins: "Handbook of Inorganic Chemistry," part 65, pp. 405–412, 1942, published by Verlag Chemie, Berlin, Germany.

MORRIS LIEBMAN, Primary Examiner.

RICHARD D. NEVIUS, ALEXANDER H. BRODMERKEL, Examiners.